(12) United States Patent
Park et al.

(10) Patent No.: US 9,439,136 B2
(45) Date of Patent: Sep. 6, 2016

(54) METHOD AND APPARATUS FOR SCANNING IN WIRELESS LAN

(71) Applicant: LG Electronics Inc., Seoul (KR)

(72) Inventors: Giwon Park, Seoul (KR); Jinsam Kwak, Seoul (KR); Kiseon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 14/405,749

(22) PCT Filed: Jul. 11, 2013

(86) PCT No.: PCT/KR2013/006179
§ 371 (c)(1),
(2) Date: Dec. 4, 2014

(87) PCT Pub. No.: WO2014/010957
PCT Pub. Date: Jan. 16, 2014

(65) Prior Publication Data
US 2015/0181507 A1 Jun. 25, 2015

Related U.S. Application Data

(60) Provisional application No. 61/670,583, filed on Jul. 11, 2012.

(51) Int. Cl.
*H04L 5/14* (2006.01)
*H04B 7/00* (2006.01)
(Continued)

(52) U.S. Cl.
CPC ............ *H04W 48/16* (2013.01); *H04W 8/005* (2013.01); *H04W 52/0216* (2013.01); *H04W 52/0229* (2013.01); *H04W 72/0446* (2013.01); *H04W 48/00* (2013.01); *H04W 80/10* (2013.01); *H04W 80/12* (2013.01); *H04W 84/12* (2013.01); *H04W 88/00* (2013.01); *H04W 88/06* (2013.01)

(58) Field of Classification Search
CPC ... H04W 48/16; H04W 48/17; H04W 48/18; H04W 48/20; H04W 80/10; H04W 80/12; H04W 88/00; H04W 88/08; H04W 52/0216; H04W 52/0229
See application file for complete search history.

(56) References Cited

U.S. PATENT DOCUMENTS 6,295,095 B1 * 9/2001 Kawabata ................ H04N 5/44
348/576
2009/0279514 A1 * 11/2009 Seok ................. H04W 74/0816
370/336

(Continued)

FOREIGN PATENT DOCUMENTS

KR 1020010006287 1/2001
KR 1020010030681 4/2001
KR 1020010031231 4/2001

*Primary Examiner* — Diane Lo
*Assistant Examiner* — Abu-Sayeed Haque
(74) *Attorney, Agent, or Firm* — Dentons US LLP

(57) ABSTRACT

A method and an apparatus for scanning in a wireless LAN are disclosed. The method for scanning in a wireless LAN comprises the steps of: enabling a station (STA) to receive, from a first access point (AP) operated in a first channel, a detection frame comprising identifier information of a second AP operated in a second channel and beacon frame transmission time information of the second AP, and enabling the STA to scan a beacon frame of the second AP on the basis of the beacon frame transmission time information of the second AP. Thus, the present invention can rapidly perform a scanning operation.

14 Claims, 16 Drawing Sheets

(51) Int. Cl.
*H04J 3/16* (2006.01)
*H04J 3/24* (2006.01)
*H04W 48/16* (2009.01)
*H04W 8/00* (2009.01)
*H04W 52/02* (2009.01)
*H04W 72/04* (2009.01)
*H04W 88/00* (2009.01)
*H04W 48/00* (2009.01)
*H04W 80/10* (2009.01)
*H04W 80/12* (2009.01)
*H04W 84/12* (2009.01)
*H04W 88/06* (2009.01)

(56) References Cited

U.S. PATENT DOCUMENTS

| | | | |
|---|---|---|---|
| 2012/0162013 A1* | 6/2012 | Piersol | H04W 64/003 342/386 |
| 2013/0177001 A1* | 7/2013 | Abraham | H04W 28/06 370/338 |
| 2013/0177002 A1* | 7/2013 | Sun | H04W 48/12 370/338 |
| 2013/0294354 A1* | 11/2013 | Zhang | H04W 72/04 370/329 |

* cited by examiner

FIG. 1
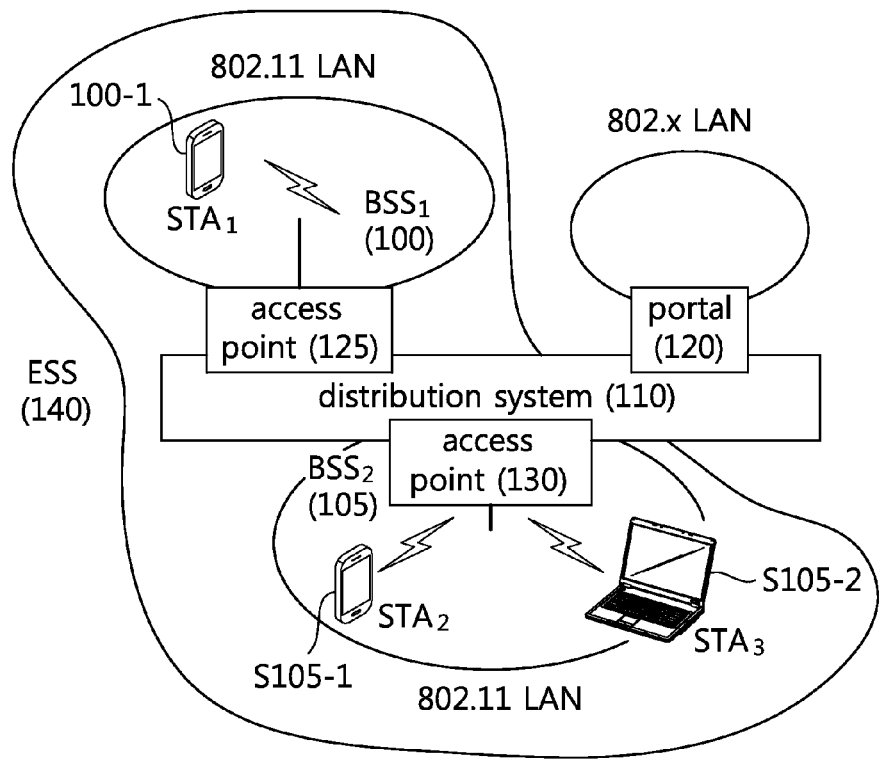
(A)
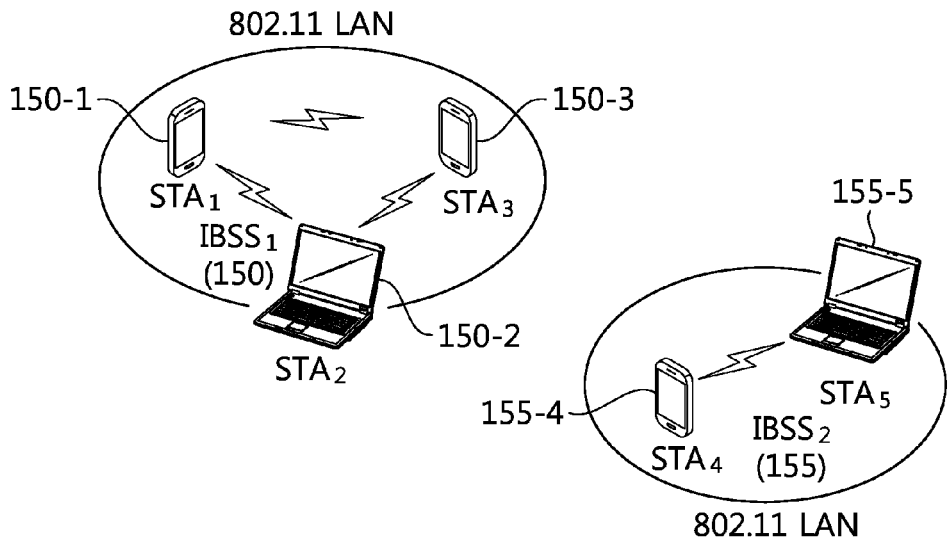
(B)

METHOD AND APPARATUS FOR SCANNING IN WIRELESS LAN

This application is a 35 USC §371 National Stage entry of International Application No. PCT/KR2013/006179 filed on Jul. 11, 2013, and claims priority to U.S. Provisional Application No. 61/670,583 filed on Jul. 12, 2012, all of which are hereby incorporated by reference in their entireties as if fully set forth herein.

BACKGROUND OF THE INVENTION

1. Field of the Invention

The present invention relates to a scanning method and apparatus, and more specifically, to a scanning method and apparatus by an STA.

2. Related Art

Recent wireless LAN technologies are evolving largely in three ways. Efforts to further increase transmission speed include IEEE (Institute of Electrical and Electronic Engineers) 802.11ac and IEEE 802.11ad as extensions to the existing WLAN evolution. IEEE802.11ad is a wireless LAN technique that employs a 60GH band. Further, broad band wireless LAN utilizing a frequency band of less than 1 GHz is nowadays on the rise to enable transmission in a broader area than by the existing WLAN and such WLAN technologies include IEEE 802.11af utilizing a TVWS (TV White Space) band and IEEE 802.11ah utilizing a 900 MHz band. These standards primarily target expansion of extended range Wi-Fi services as well as smart grid and wide-area sensor networks. Further, the conventional WLAN MAC (Medium Access Control) techniques suffer from the problem that the initial link setup time is significantly increased in some cases. Standardization of IEEE 802.11ai is actively going on to address such issue to thus enable quick access from an STA to an AP.

IEEE 802.11ai is oriented towards the MAC technology that copes with quick authentication procedures for significantly saving initial setup and association time of wireless LAN, and its standardization activities were started with a regular task group on January, 2011. In order to enable a quick access procedure, the IEEE 802.11ai task group is discussing the simplification of the procedures in AC discovery, network discovery, TSF (Time Synchronization Function) synchronization, authentication & association, and process merging with higher layers. Among others, the ideas such as procedure merging utilizing piggyback of DHCP (Dynamic Host Configuration Protocol), optimization of the full EAP (Extensible Authentication Protocol) using concurrent IP, and efficient selective AP (Access Point) scanning are actively under discussion.

SUMMARY OF THE INVENTION

An object of the present invention is to provide a scanning method.

Another object of the present invention is to provide an apparatus of performing scanning.

To achieve the above objects of the present invention, according to an aspect of the present invention, a scanning method in a wireless LAN may comprise receiving by an STA (station), from a first AP (Access Point) operating on a first channel, a discovery frame including identifier information of a second AP operating on a second channel and beacon frame transmission time information of the second AP and scanning by the STA a beacon frame of the second AP based on the beacon frame transmission time information of the second AP, wherein the beacon frame transmission time information of the second AP may include information on a difference between a transmission time of the discovery frame and a transmission time of a beacon frame of the second AP transmitted after the discovery frame is transmitted, and wherein a transmission period of the discovery frame may be shorter than a transmission period of a beacon frame of the first AP.

To achieve the above objects of the present invention, according to another aspect of the present invention, an STA (station) of a wireless LAN system may include a processor, wherein the processor may be implemented to receive, from a first AP (Access Point) operating on a first channel, a discovery frame including identifier information of a second AP operating on a second channel and beacon frame transmission time information of the second AP and to scan a beacon frame of the second AP based on the beacon frame transmission time information of the second AP, wherein the beacon frame transmission time information of the second AP may include information on a difference between a transmission time of the discovery frame and a transmission time of a beacon frame of the second AP transmitted after the discovery frame is transmitted, and wherein a transmission period of the discovery frame may be shorter than a transmission period of a beacon frame of the first AP.

A scanning procedure may be rapidly performed.

BRIEF DESCRIPTION OF DRAWINGS

FIGS. 1(A)-(B) are concept views illustrating the structure of a wireless local area network (WLAN).

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSSs 100 and 105 are sets of APs (Access Points) and STAs (stations), such as AP 125 and STA1 100-1, which may successfully sync with each other to perform communication, and the BSSs 100 and 105 do not mean specific areas. The BSS 105 may include one AP 130 and one or more STAs 105-1 and 105-2 connectible to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), an independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
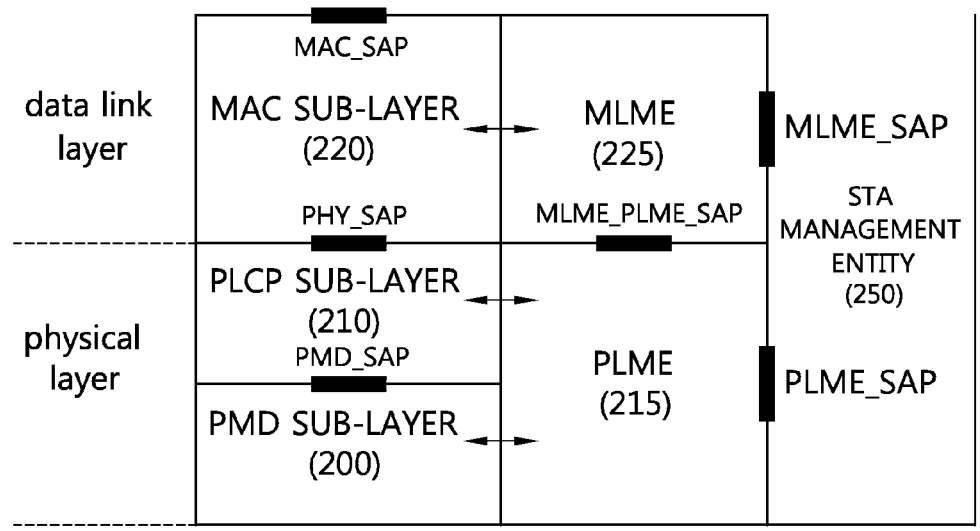
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include a management entity.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. At this time, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
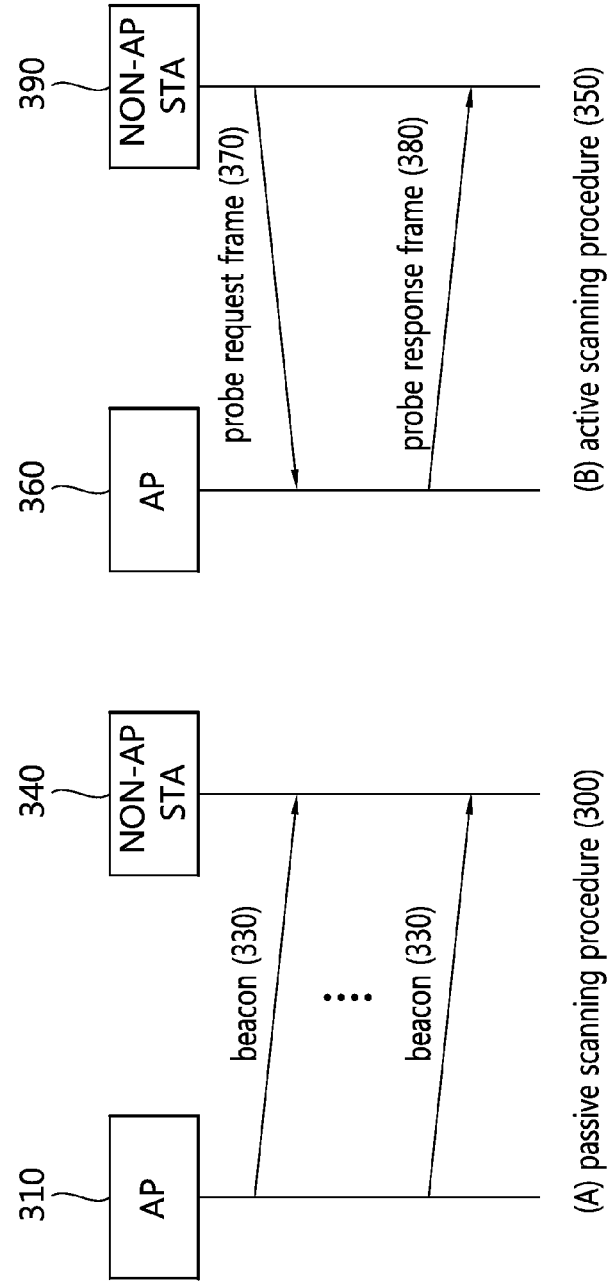
FIGS. 3(A)-(B) are concept views illustrating a scanning method in a WLAN.

FIG. 3 is a concept view illustrating a scanning method in a WLAN.

Referring to FIG. 3, scanning methods may be divided into passive scanning 300 and active scanning 350.

Referring to FIG. 3(A), the passive scanning 300 may be performed by a beacon frame 330 that is periodically broadcast from the AP 300. The AP 300 over the wireless LAN broadcasts a beacon frame 330 to a non-AP STA 340 at every particular period (e.g., every 100 msec). The beacon frame 330 may contain information on a current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without requiring the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' Ch. 8.3.3.2 Beacon Frame, as disclosed in November 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Referring to FIG. 3(B), the active scanning 350 refers to a method in which the non-AP STA 390 leads scanning by transmitting a probe request frame 370 to the AP 360.

The AP 360 may wait a random time after receiving the probe request frame 370 from the non-AP STA 390 to prevent frame collision and may then transmit a probe response frame 380, which includes network information, to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.1.

After the scanning is done, the AP and the STA may perform an authentication and association process.

Figure 4:
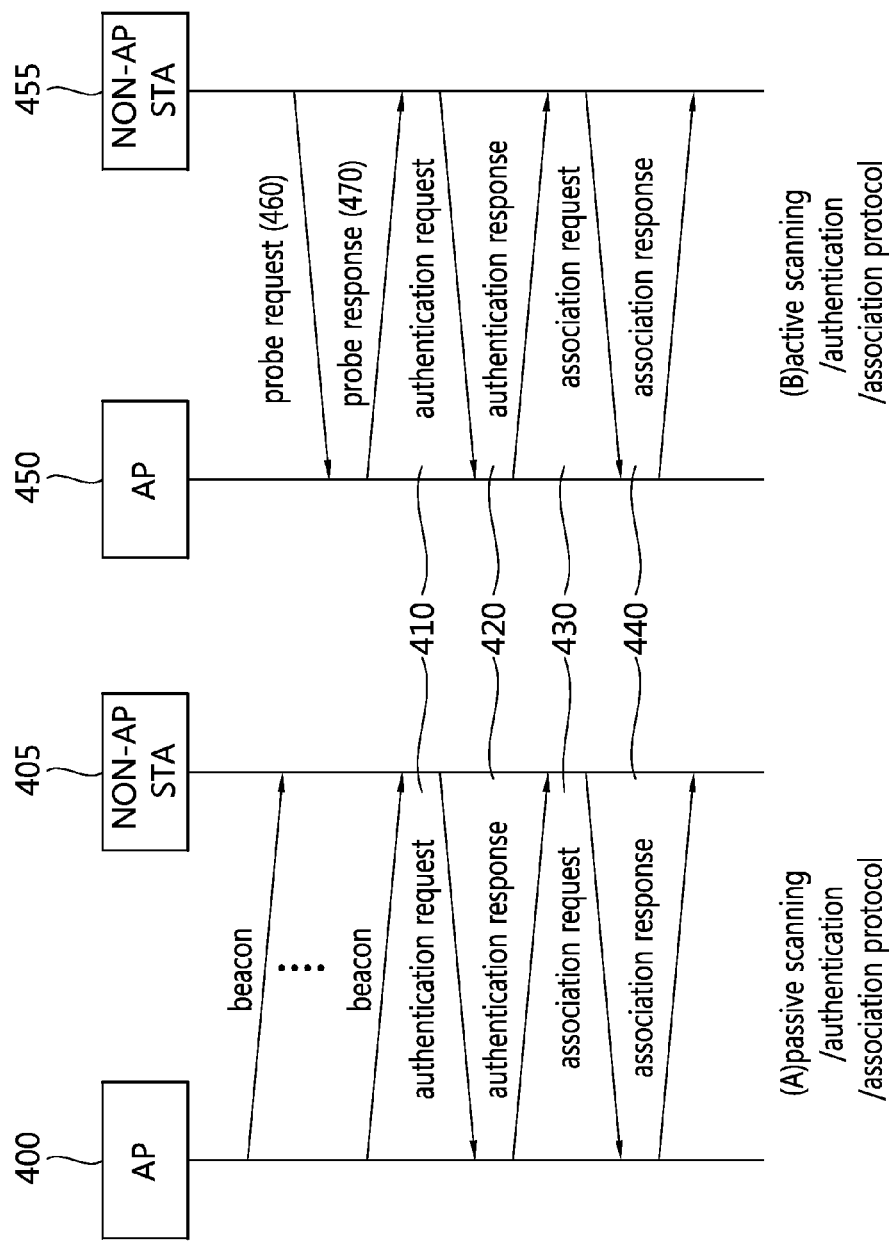
FIG. 4 is a concept view illustrating an authentication and association process after scanning between an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be likewise performed by exchanging an authentication request frame 410/authentication response frame 420 and an association request frame 330/association response frame 440 between the APs 400 and 450 and the non-AP STAs 405 and 455 regardless of whether the scanning scheme used is active scanning or passive scanning.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 410 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information regarding the capability of the non-AP STAs 405 and 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
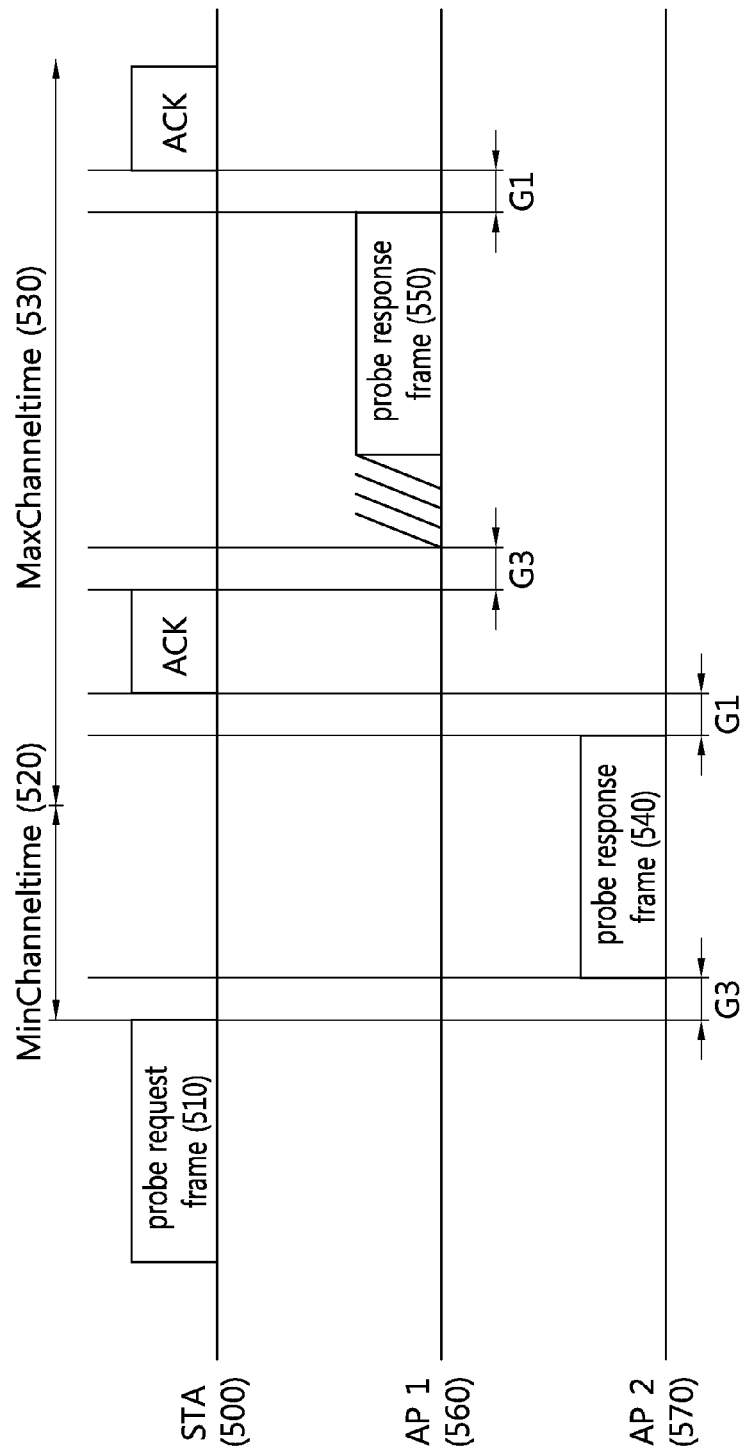
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received, to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may use carrier sense multiple access/collision avoidance (CSMA/CA) as an access protocol to prevent collision between STAs in a backoff scheme. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

BSSID may have a value corresponding to the MAC address of an AP as an indicator to specify the AP. SSID (Service Set Identification) is a network term to specify an AP, which may be read by a person operating an STA. BSSID and/or SSID may be used to specify an AP.

The STA 500 may specify an AP based on information for specifying the APs 560 and 570 included by MLME-SCAN.request primitive. The specified APs 560 and 570 may transmit the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the minimum channel time 520, the STA 500 shifts scanning channels to perform scanning on other channel. In case the STA 500 receives the probe response frame 550 until the minimum channel time 520, it may process the received probe response frames 550 and 550 after waiting until the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN.request primitive is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determine whether infrastructure BSS, IBSS MBSS(mesh basic service set), or all are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe request frame during active scanning |

TABLE 1-continued

| name | description |
|---|---|
| ChannelList | Specifies a list of channels that are examined when scanning for a BSS |
| MinChannelTime | The minimum time(in TU) to spend on each channel when scanning |
| MaxChannelTime | The maximum time(in TU) to spend on each channel when scanning |
| RequirementInforamtion | This element is optionally present if dot11RadioMeasurementActivated is true and is placed in a probe request frame to request that the responding STA include the requested information in the probe response frame |
| SSID List | One or more SSID element that are optionally present when dot11MgmtOptionSSIDListActivated is true |
| ChannelUsage | Specifies request types for the ChannelUsage request |
| AccessNetworkType | Specifies a desired specific access networktype or the wildcard access network type. This field is present when dot11InterworkingSeviceActivated is true |
| HESSID | Specifies the desired specific HESSID network identifier or the wildcard network identifier. This field is present when dot11InterworkingServiceActivated is true |
| Mesh ID | Only present if BSS Type = MESH or BSSType = ANY_BSS. Specifies the desired Mesh ID or wildcard Mesh ID |
| RequestParameters | The parameter define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added depend on the vendor |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
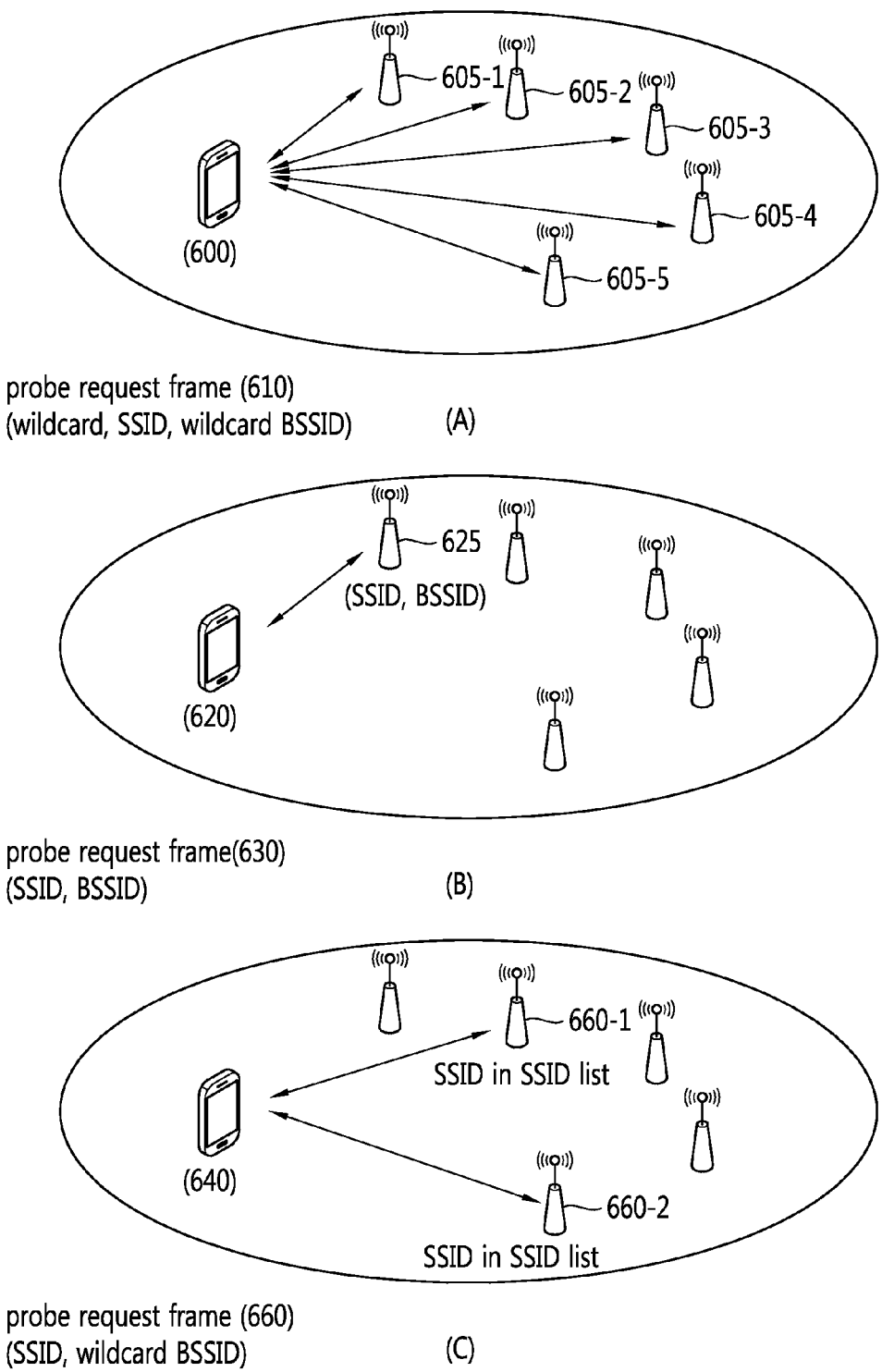
FIGS. 6(A)-(C) are concept views illustrating a probe request frame transmission method.

FIG. 6 is a concept view illustrating a probe request frame transmission method.

FIG. 6 discloses methods of broadcasting, multicasting, and unicasting probe request frames from an STA.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

Figure 7:
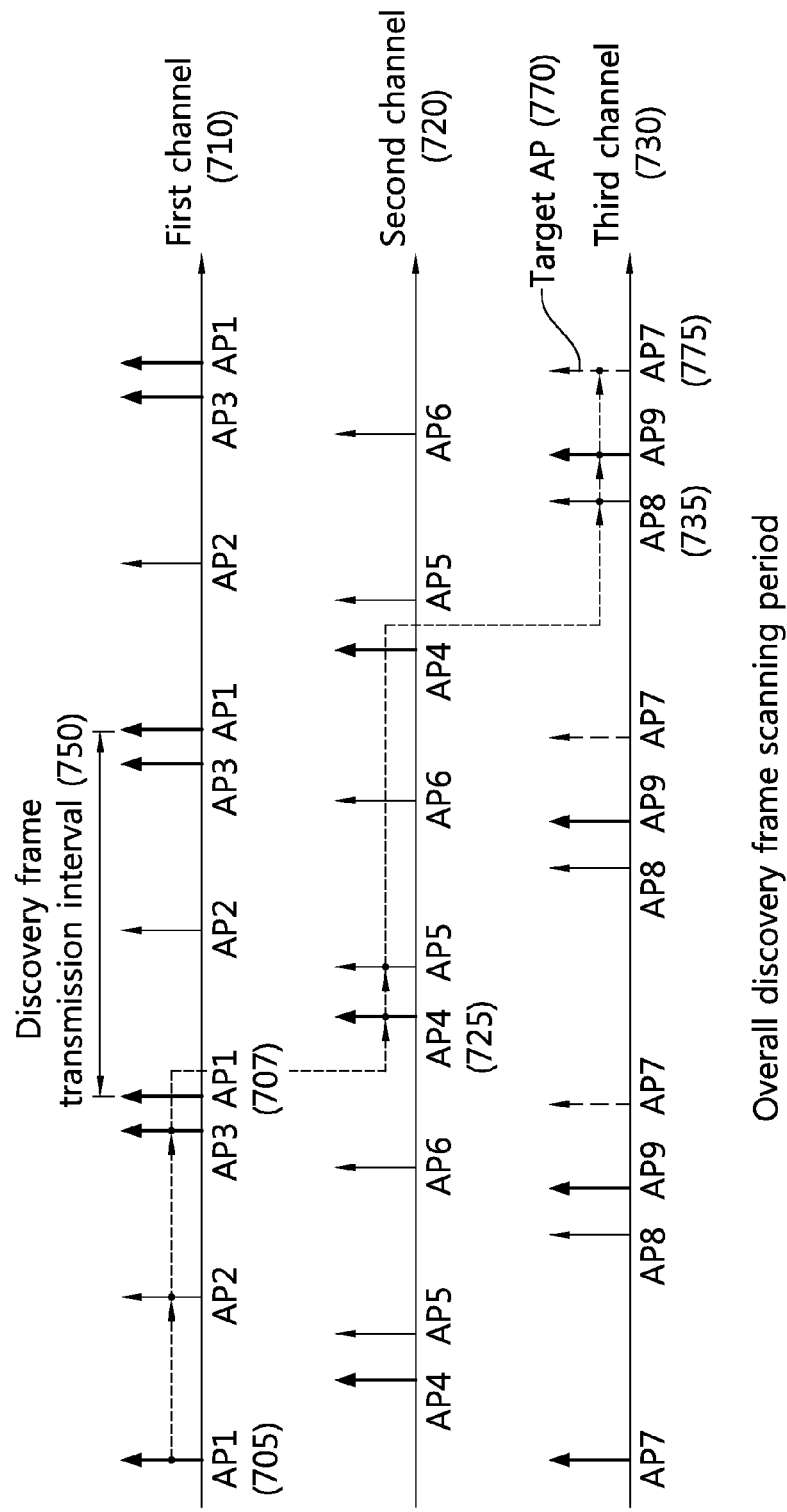
FIG. 7 is a concept view illustrating a method of performing scanning on a plurality of channels by an STA.

FIG. 7 is a concept view illustrating a method of performing scanning on a plurality of channels by an STA.

It is assumed in FIG. 7 that an STA performs scanning through a plurality of frequency channels (first channel 710, second channel 720, and third channel 730). Further, a target AP on which the STA intends to perform initial access is assumed to be on the third channel 730 (for example, seventh AP 770). Further, the STA is assumed to be in operation on the first channel 710. The AP where the STA intends to perform scanning or intends to be associated is defined as a target AP. For example, the target AP may be an AP specified by information (e.g., SSID and/or BSSID information) to specify an AP included in the MLME-SCAN.request primitive.

The STA may monitor a frame that is transmitted from the AP operating on the first channel 710. The first AP, the second AP, and the third AP are APs operating on the first channel 710. The first AP, second AP, and third AP may transmit a discovery frame through the first channel 710. The discovery frame is a frame that is transmitted within a transmission period of a beacon frame from each AP, and the discovery frame may be a frame transmitted with a shorter period than the beacon frame. In other words, the discovery frame is a frame that is transmitted with a smaller period than a transmission period of the beacon frame. The discovery frame may contain identifier information (SSID, BSSID) of an AP that transmits the discovery frame. The discovery frame is transmitted before the beacon frame is transmitted to the STA, so that the STA may previously detect that the AP is present on the corresponding channel. An interval at which the discovery frame is transmitted from one AP is referred to as a frame transmission interval 750.

That is, the STA may detect whether an AP that the STA desires to be associated with is present on the current operation channel, based on the discovery frame.

The STA may receive the discovery frame 705 transmitted from the first AP on the first channel 710, and the STA may sequentially receive a discovery frame transmitted from the second AP and a discovery frame transmitted from the third AP. The STA, in case the discovery frame transmission interval 750 of the first AP elapses, may re-receive a discovery frame 707 transmitted from the first AP. The STA may be aware that there is no target AP (seventh AP, 770) on the first channel through the discovery frame received during the discovery frame transmission interval. The STA may shift the scanning channel to other channel (second channel, 720) in order to discover the seventh AP 770.

The STA may shift the scanning channel from the first channel 710 to the second channel 720. The STA may receive a discovery frame 723 transmitted from the fourth AP on the second channel 720. Next, the STA may receive a discovery frame transmitted from the fifth AP and a discovery frame transmitted from the sixth AP. The STA failed to receive a discovery frame from the target AP 770 not only on the first channel but also on the second channel until the passage of the discovery frame transmission interval of the fourth AP that has first transmitted the discovery frame.

In such case, the STA may shift the scanning channel to a next channel, the third channel 730, and the STA may perform scanning.

The STA receives the discovery frame 735 transmitted from the eighth AP on the third channel 730. Subsequently, the STA may receive a discovery frame transmitted from the ninth AP and a discovery frame 775 transmitted from the seventh AP 770. When receiving the discovery frame 775 from the seventh AP 770 that is the target AP, the STA may recognize that the seventh AP 770, the target AP, is operating on the third channel 730. In such case, the STA may monitor a beacon frame transmitted from the seventh AP 770 on the corresponding channel, and the STA may receive the beacon frame to proceed with initial access.

In case the existing initial access method is used, the STA may consume, as its scanning time, the time calculated by adding the time of the reception of the beacon frame to the value obtained by multiplying the discovery frame transmission interval by the number of frequency channels on which scanning has been performed substantially until before the STA is associated with the target AP.

The scanning method according to an embodiment of the present invention includes an initial access method by the STA, which allows the STA to save the scanning time when the STA performs scanning.

In the scanning method according to an embodiment of the present invention, various additional pieces of information may be defined in a discovery frame and the same may be transmitted in order to reduce the scanning time of a terminal.

Figure 8:
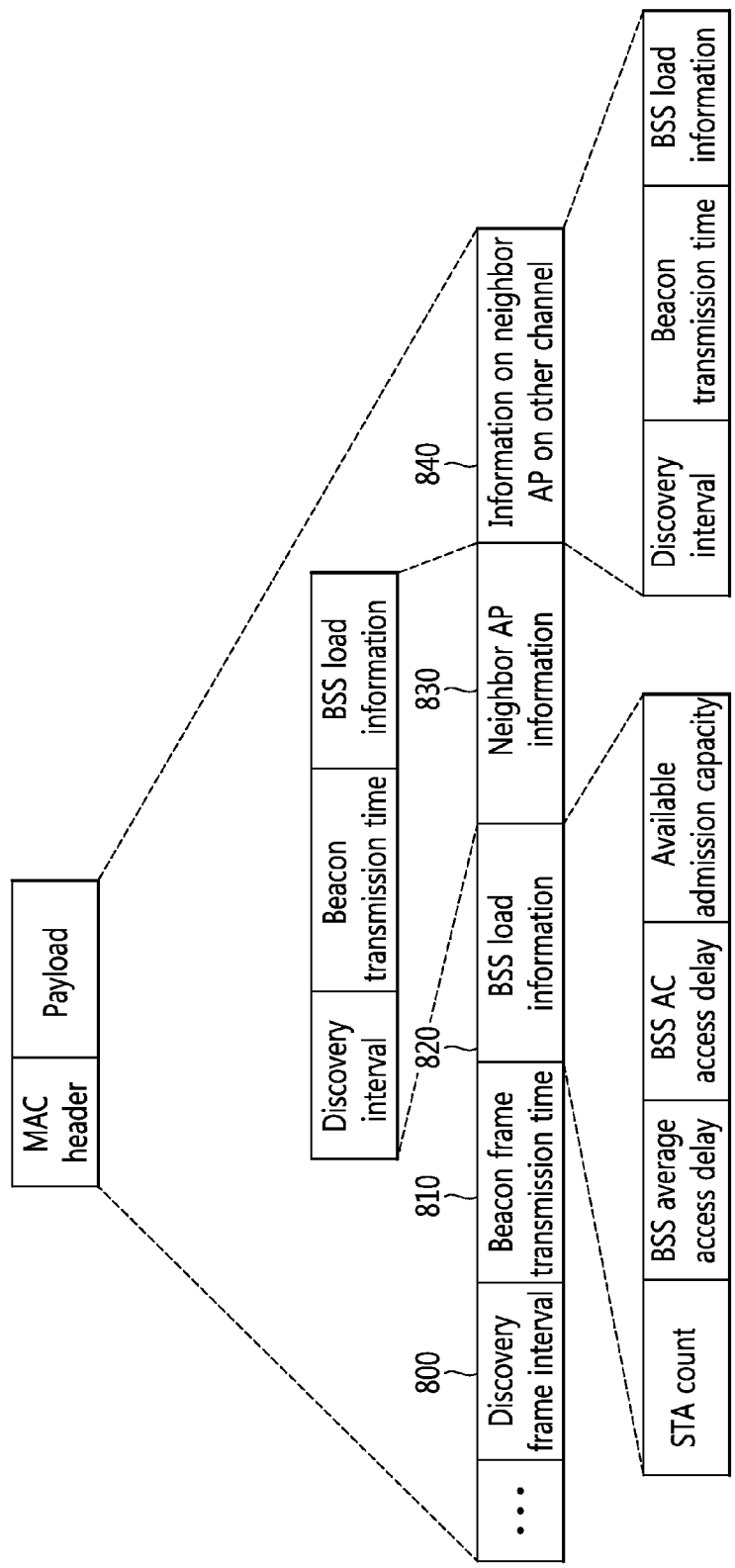
FIG. 8 is a concept view illustrating a discovery frame according to an embodiment of the present invention.

FIG. 8 is a concept view illustrating a discovery frame according to an embodiment of the present invention.

Referring to FIG. 8, a discovery frame may include discovery frame interval information 800, beacon frame transmission time information 810, BSS load information 820, neighbor AP information 830, and information 840 on a neighbor AP on other channel.

The discovery frame interval information 800, beacon frame transmission time information 810, BSS load information 820, neighbor AP information 830, and information 840 on a neighbor AP on other channel, each, may contain what is set forth in the following table.

TABLE 2

| Information | Details |
| --- | --- |
| Discovery frame interval | Transmission period of discovery frame of current AP (AP having transmitted discovery frame) |
| Beacon frame transmission time | May indicate transmission time of beacon frame in offset intervals, US (micro second), or TS (symbol time) from discovery frame transmission time of AP as transmission time of beacon frame first transmitted after discovery frame received from current AP (AP having transmitted discovery frame) |
| BSS load information | Refer to following Table 3 |
| Neighbor AP information | Information on other AP operating on current channel, transmitting discovery frame (refer to Table 4) |
| Neighbor AP information of other frequency channel | Information on other AP operating on other channel than current channel where discovery frame is transmitted (refer to Table 5) |

The BSS load information contained in the discovery frame may include additional information as follows.

TABLE 3

| BSS load information | |
| --- | --- |
| information | description |
| STA count | The STA Count filed is interpreted as an unsigned integer that indicates the total number of STAs currently associated with this BSS |

TABLE 3-continued

BSS load information

| information | description |
| --- | --- |
| BSS average access delay | The BSS Average Access Delay is a scalar indication of the relative level of loading at an AP. A low value indicates more available more capacity than a higher value |
| BSS AC access delay | The BSS AC access dealy is a scalar indication of the average access dealy at a QoS AP for services for each of the indicated Access Categories |
| Available admission capacity | The Available Admission Capacity field is 2 octets long and contains an unsigned integer that specifies the remaining amount of medium time available via explicit admission control, in units of 32us/s/ The field is helpful for roaming STAs to select an AP that is likely to accept future admission control request. |

The neighbor AP information contained in the discovery frame may include additional information as shown in the following Table 4.

TABLE 4

Neighbor AP information

| Information | details |
| --- | --- |
| For (i=0; i>=number of APs; i++){ | |
| Discovery interval | Discovery frame transmission period of neighbor AP |
| Beacon transmission time | Transmission time of beacon frame first transmitted by AP after discovery frame transmitted from neighbor AP. May indicate beacon frame transmission points in offset intervals, US (micro second), or TS (symbol time) from discovery frame transmission time of neighbor AP |
| BSS load information | Refer to Table 3 |

Referring to Table 4, as the neighbor AP information, the discovery interval for each of the APs operating on the current channel, beacon transmission time, and BSS load information may be included in the discovery frame, and the same may be transmitted. The beacon transmission time interval included in the neighbor AP information as set forth in Table 4 may be information regarding a beacon transmission time that is transmitted from a neighbor AP with respect to the discovery frame time received by the current STA. In other words, the STA may obtain the information on the beacon transmission time transmitted from the neighbor AP with respect to the time of the received discovery frame.

The information on the neighbor AP on other frequency channel contained in the discovery frame may include additional information as shown in the following Table 5.

TABLE 5

Information on neighbor AP on other channel

| Information | details |
| --- | --- |
| For (i=0; i>=number of frequency channels; i++){ | |
| For (i=0; i>=number of APs; i++){ | |
| Discovery interval | Discovery frame transmission period of neighbor AP Discovery frame transmission period of neighbor AP on other frequency channel |
| Beacon transmission time | Transmission time of beacon frame first transmitted by neighbor AP on other frequency channel after discovery frame transmitted from neighbor AP on other frequency channel. May indicate beacon frame transmission points in offset intervals, US (micro second), or TS (symbol time) from discovery frame transmission time of neighbor AP on other frequency channel |
| BSS load information | Refer to Table 3 |

Referring to Table 5, as the neighbor AP information, the discovery interval for each of the APs operating on a channel other than the current channel, beacon transmission time, and BSS load information may be included in the discovery frame, and the same may be transmitted. The beacon transmission time interval included in the information on the neighbor AP on other channel as set forth in Table 5 may be information regarding a beacon transmission time that is transmitted from a neighbor AP on other channel with respect to the discovery frame time received by the current STA. In other words, the STA may obtain the information on the beacon transmission time transmitted from the neighbor AP on other channel with respect to the time of the received discovery frame.

A scanning method by an STA when the STA receives a discovery frame including information as set forth in Table 2 is now disclosed.

Figure 9:
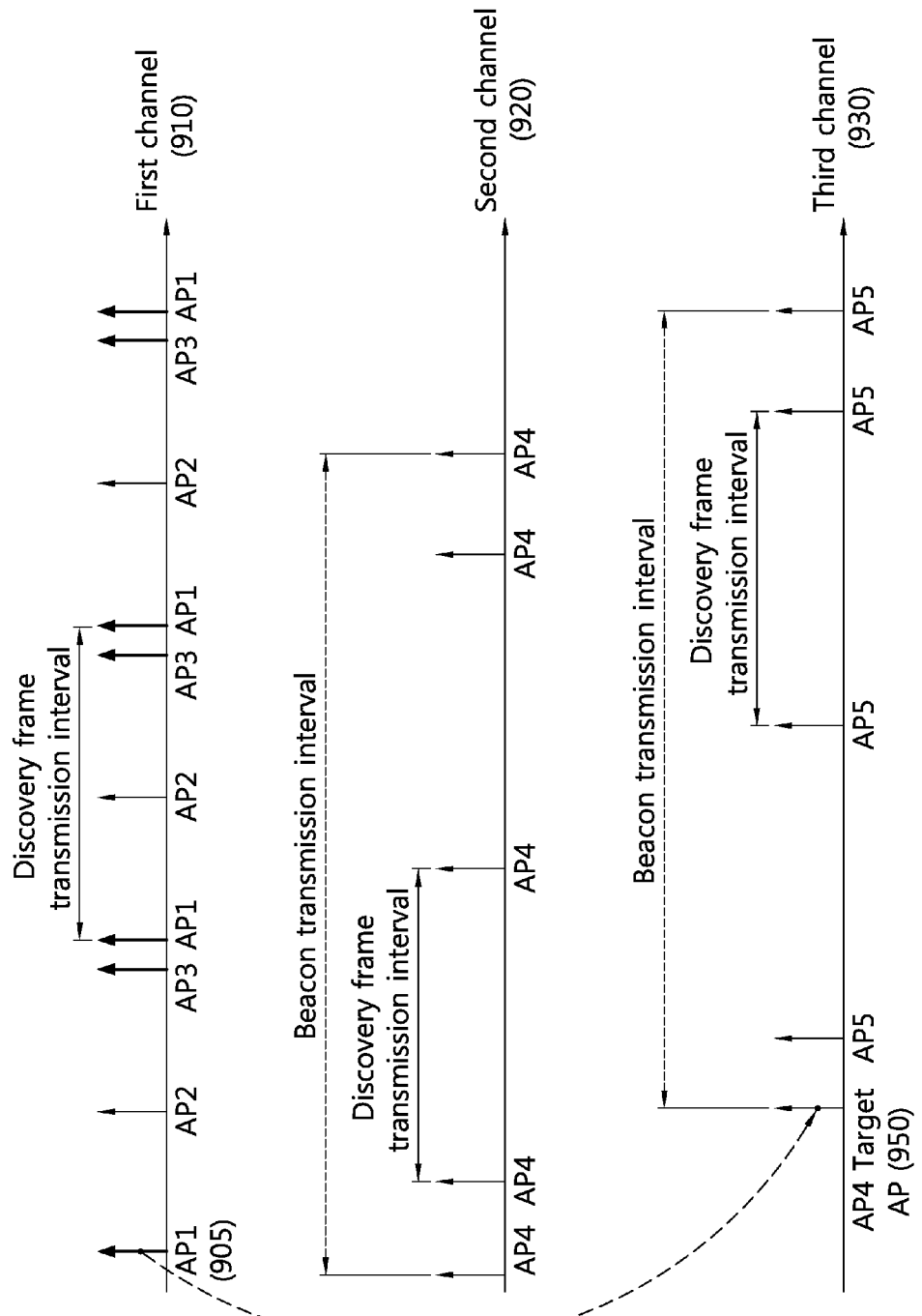
FIG. 9 is a concept view illustrating a procedure of association to a target AP by an STA according to an embodiment of the present invention.

FIG. 9 is a concept view illustrating a procedure of association to a target AP by an STA according to an embodiment of the present invention.

It is assumed in FIG. 9 that the STA performs scanning through a plurality of frequency channels (first channel 910, second channel 920, and third channel 930). Further, a target AP to which the STA intends to gain initial access is assumed to be an AP (e.g., fifth AP) on the third channel.

The STA may receive a discovery frame 905 transmitted from the first AP on the first channel. The discovery frame received by the STA may contain the information set forth above in connection with Table 2. The STA may transmit information on other AP operating on the first channel 910 on which the first AP is currently in operation and information on APs operating on the second channel 920 and the third channel 930 based on the neighbor AP information and information on a neighbor AP on other frequency channel which are included in the discovery frame 905 transmitted from the first AP.

The AP may obtain information on the channel on which the fifth AP, the target AP to which the STA intends to gain access, is in operation, based on the information on the neighbor AP on other frequency channel included in the received discovery frame.

The STA may recognize that the fifth AP is in operation on the third channel 930 based on the discovery frame, and the STA may shift the scanning channel to the third channel 930. The scanning channel may be previously shifted to the channel on which the target AP operates, or the shift of scanning channel may be also performed based on the information on the time during which the target AP transmits a beacon frame. The STA may obtain the information on the beacon transmission time of the fifth AP through the discovery frame received on the first channel. Since the STA may be aware of the transmission time of the beacon frame 950 transmitted from the target AP, the STA may operate in sleep mode until before the beacon frame 950 is transmitted, thereby saving battery. For example, the STA may switch to sleep mode to perform the operation in case the time during which the beacon frame 950 is transmitted is left by a predetermined time or more. Such operation of the STA is described below in further detail.

Figure 10:
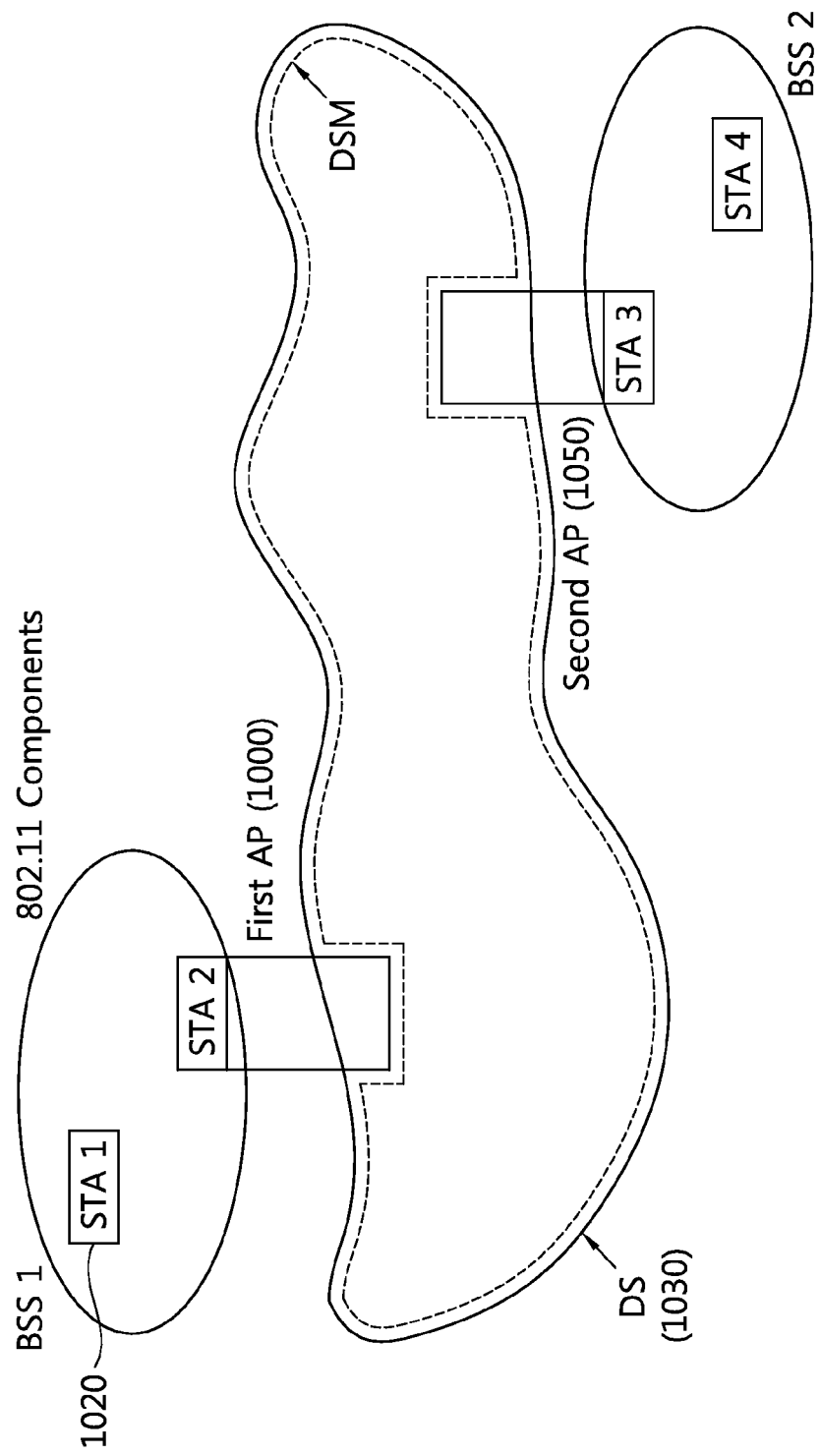
FIG. 10 is a concept view illustrating an operation of an AP according to an embodiment of the present invention.

FIG. 10 is a concept view illustrating an operation of an AP according to an embodiment of the present invention.

FIG. 10 discloses a method of sharing information between an AP operating on a current channel and an AP operating on other channel.

Referring to FIG. 10, it is assumed that the first AP 1000 is an AP operating on a current first channel, and the second AP 1050 is an AP operating on a current second channel.

The first AP 1000 and the second AP 1050 may be APs connected to a single extended service set based on a distribution system. In other words, a plurality of APs connected to one another in an extended service set (ESS) may be extended through a distribution system 1030, and information on each AP may be transmitted and shared with other APs between the plurality of APs based on the distribution system 1030. For example, the first AP 1000 may transmit its discovery interval, beacon transmission time, and BSS load information to the second AP 1050. Further, the second AP 1050 may transmit its discovery interval, beacon transmission time, and BSS load information to the first AP 1000.

As another method, an AP may obtain information on other APs based on measurement information transmitted from the STA. For example, the first STA 1020 associated with the first AP 1000 to operate may transmit, to the first AP 1000, information on a result of scanning the current channel and other channel in response to a request from the first AP 1000. The information on the result of scanning the other channel, which is transmitted from the first STA 1020 to the AP, may contain information on an AP operating on the current channel and information on an AP operating on other channel. That is, the information on the scanning result may contain BSS load information, beacon frame transmission time, and discovery interval information, etc. of the other APs. The AP may be reported a result of scanning by an STA present in the BSS to obtain the information on the operation of the other APs.

FIG. 10 illustrates an exemplary method by which the AP obtains information on APs operating on the current channel and other channel, and the AP may also obtain such information on the APs by other methods.

Figure 11:
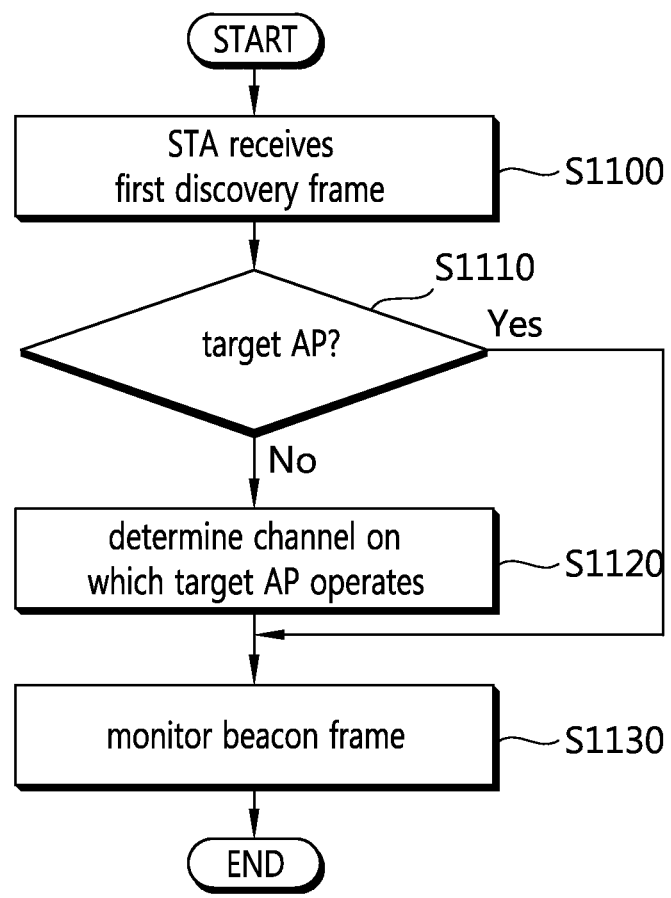
FIG. 11 is a flowchart illustrating an operation of an STA according to an embodiment of the present invention.

FIG. 11 is a flowchart illustrating an operation of an STA according to an embodiment of the present invention.

Referring to FIG. 11, the STA receives a first discovery frame (step S1100).

When receiving the first discovery frame, the STA determines whether the AP having transmitted the first discovery frame is a target AP (step S1110).

The STA may determine whether the AP that has transmitted the current discovery frame is the target AP based on identifier information of the AP included in the first discovery frame. In case the AP that has transmitted the first discovery frame is the target AP, the STA need not shift channels to perform scanning. The STA may obtain information on the beacon frame transmission time of the target AP based on the beacon transmission time information included in the received first discovery frame.

The beacon frame is monitored (step S1130).

In case the AP that has transmitted the first discovery frame is the target AP, the STA may obtain information on the time during which the target AP transmits the beacon frame through the beacon transmission time included in the discovery frame. The STA may receive a beacon frame transmitted from the target AP based on the information on the time during which the beacon frame is transmitted, thereby performing a passive scanning procedure.

In an additional embodiment, the STA may determine whether to switch to sleep mode based on the beacon frame transmission time information as described above. In other words, in case it is determined there is a plenty of time remaining until the target AP transmits a beacon frame based on the beacon frame transmit information, the STA may switch to sleep mode to reduce power consumption of the STA.

In case the STA determines that the AP that has transmitted the discovery frame is not the target AP, the STA determines a channel on which the target AP operates (step S1120).

In case the STA determines that the AP having transmitted the discovery frame is not the target AP, the STA may obtain the information regarding the channel on which the target AP operates based on the neighbor AP information and information on the neighbor AP on other channel, which are included in the first discovery frame.

In case the neighbor AP information contains the information on the target AP, the STA may be aware that the target AP is present on the current channel. In case the target AP is present on the current channel, the STA need not shift the scanning channel. The STA may monitor the beacon frame transmitted from the target AP n the current channel based on the beacon frame transmission time information of the target AP which is included in the discovery frame (step S1130).

In case the information on the neighbor AP on other channel contains the target AP information, this indicates that the target AP is not present on the current channel, and thus, the STA shifts the scanning channel to other channel on which the target AP is present. The STA that has shifted the scanning channel to other channel may monitor a beacon frame transmitted from the target AP based on the beacon frame transmission time information contained in the discovery frame (step S1130).

The scanning channel may be previously shifted to the channel on which the target AP operates, or the shift of scanning channel may be also performed based on the information on the time during which the target AP transmits a beacon frame. In an additional embodiment, the STA that has shifted the scanning channel to other channel may also determine whether the STA switches to sleep mode based on the time taken until the target AP transmits a beacon frame.

By using such method, in case there is a plenty of time left until a beacon frame is transmitted, the STA may switch to sleep mode without unnecessarily operating in active mode, thereby reducing power consumption.

Figure 12:
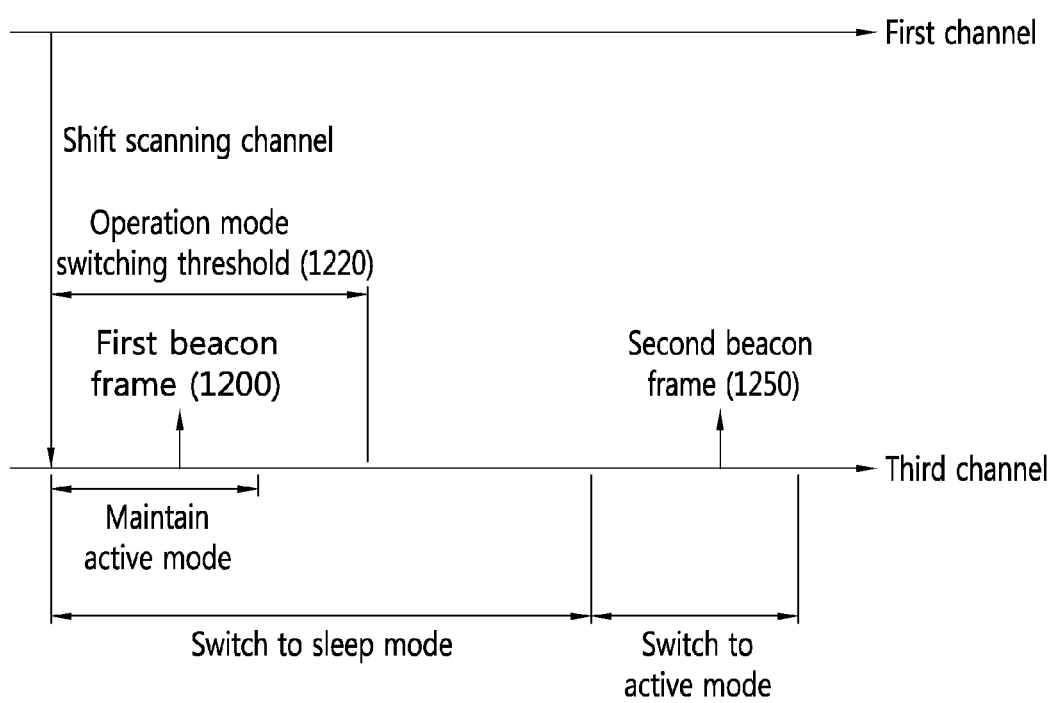
FIG. 12 is a concept view illustrating an operation mode switching method by an STA according to an embodiment of the present invention.

FIG. 12 is a concept view illustrating an operation mode switching method by an STA according to an embodiment of the present invention.

Referring to FIG. 12, the STA may determine whether to switch the operation modes of an AP by setting a predetermined threshold. In case the time taken until the target AP transmits a beacon frame is smaller than the operation mode switching threshold 1220, the STA might not switch the operation mode from active mode to sleep mode. In contrast, in case the time taken until the target AP transmits a beacon frame is larger than or equal to the operation mode switching threshold, the STA may switch the operation mode from active mode to sleep mode. The STA that has switched to sleep mode may switch back to active mode to operate, at the time when a beacon frame is transmitted afterwards.

The STA may switch from active mode to sleep mode after switching the scanning channel, or the STA may switch from active mode to sleep mode before switching the scanning channel and the STA may then switch back to active mode to switch the scanning channel.

The beacon frame transmitted from the target AP may be assumed to be a first beacon frame 1200. The STA may calculate the time until the first beacon frame 1200 is transmitted through the beacon transmission time information of the first beacon frame 1200 included in the received discovery frame. Since the first beacon frame transmission time calculated by the STA is smaller than the operation mode switching threshold 1220, the STA may remain in active mode to monitor the beacon frame.

In contrast, the beacon frame transmitted from the target AP may be assumed to be a second beacon frame 1250. The STA may calculate the time until the second beacon frame 1250 is transmitted through the beacon transmission time information of the second beacon frame 1250 included in the received discovery frame. Since the second beacon frame transmission time calculated by the STA is larger than the operation mode switching threshold 1220, the STA may switch from active mode to sleep mode. The STA that has switched to sleep mode may switch back to active mode to operate at the timing when the second beacon frame 1250 is transmitted.

Figure 13:
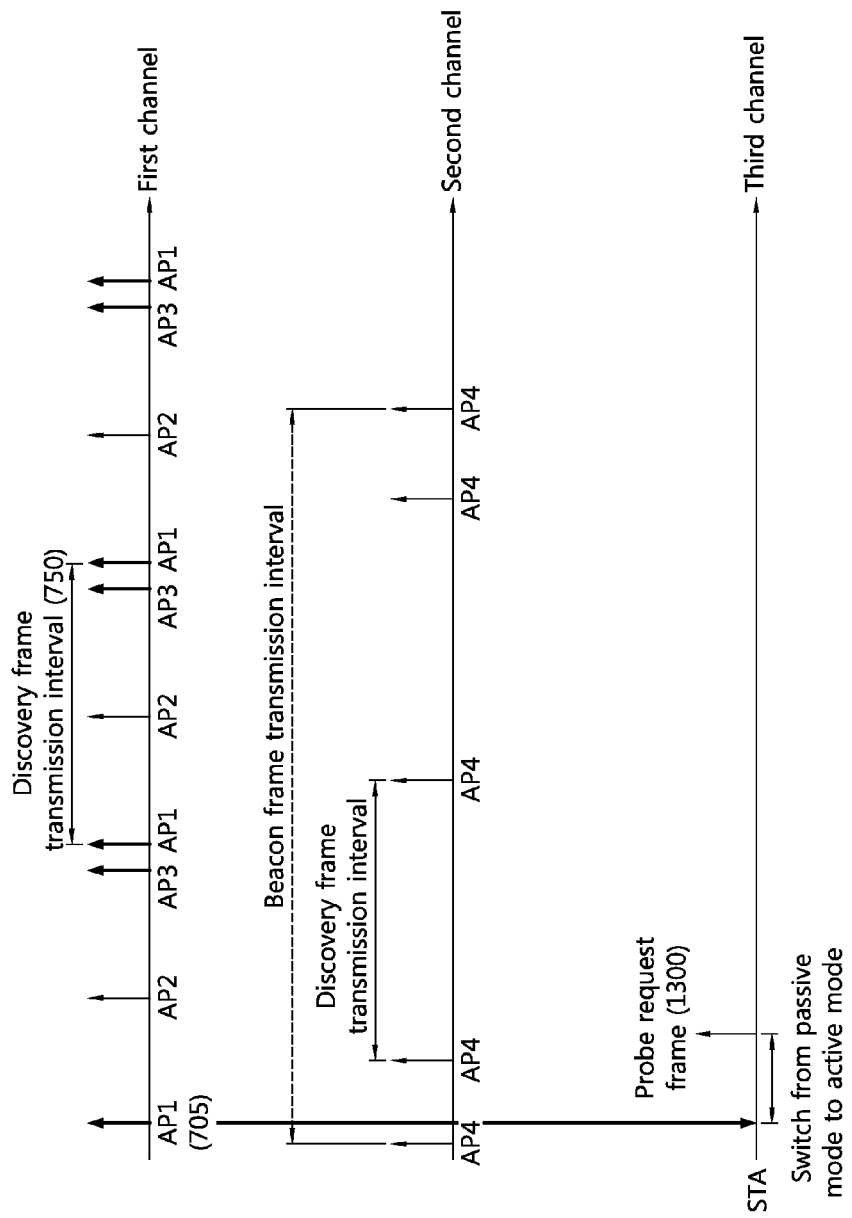
FIG. 13 is a concept view illustrating a scanning method by an STA according to an embodiment of the present invention.

FIG. 13 is a concept view illustrating a scanning method by an STA according to an embodiment of the present invention.

FIG. 13 is a concept view illustrating a method of receiving a discovery frame by an STA and switching the scanning mode from passive mode to active mode based on information of a target AP included in the discovery frame. Like FIG. 8, it is assumed in FIG. 12 that the STA performs scanning through a plurality of frequency channels (first channel, second channel, and third channel). Further, a target AP to which the STA intends to gain initial access is assumed to be an AP (e.g., fifth AP) on the third channel.

Referring to FIG. 13, the STA may receive a discovery frame transmitted from the first AP on the first frequency channel.

The discovery frame may contain the information set forth above in connection with Table 2. The STA may receive information on an AP operating on the first channel and information on APs operating on the second channel and third channel based on the discovery frame transmitted from the first AP.

The AP may obtain information on the channel on which the fifth AP, the target AP to which the STA intends to gain access, is in operation, and the discovery interval, beacon transmission time, and BSS load information of the fifth AP, based on the information on the neighbor AP on other channel included in the received discovery frame.

For example, the STA may recognize that the fifth AP is in operation on the third channel through the information on the neighbor AP on other channel included in the discovery frame. The STA may shift the scanning channel to the third channel and the STA may transmit a probe request frame 1300 including the identifier information of the fifth AP. The STA may receive a probe response frame transmitted from the target AP in response to the probe request frame 1300.

The STA may obtain the information on the target AP, shift to the channel on which the target AP operates, and immediately perform active scanning. Or, the STA may also determine which one of active scanning and passive scanning the STA is to perform through an additional determination.

For example, the STA may determine whether there is much load of the target AP through the BSS load information of the target AP. In case the load of the target AP is high, it may be difficult to obtain a medium to transmit a probe request frame 1300 that is transmitted to separately perform an active scanning procedure. Accordingly, in case the load of the target AP is high, the STA may perform a scanning procedure by monitoring a beacon frame transmitted from the target AP as described above in connection with FIG. 8, without transmitting a probe request frame 1300 for transmitting active scanning.

As another example, the STA may also determine whether to switch scanning modes through the information on the time left until a beacon frame is transmitted. For example, in case the time taken until the target AP transmits a beacon frame is larger than a scanning mode switching threshold, the STA may switch the scanning mode to active mode, performing scanning. In contrast, in case the time taken until the target AP transmits a beacon frame is smaller than or equal to the scanning mode switching threshold, the STA may maintain the scanning mode at passive mode, performing scanning. The scanning mode switching threshold may be a threshold for the STA to determine whether to switch the scanning mode from passive mode to active mode based on the beacon frame transmission time information.

Figure 14:
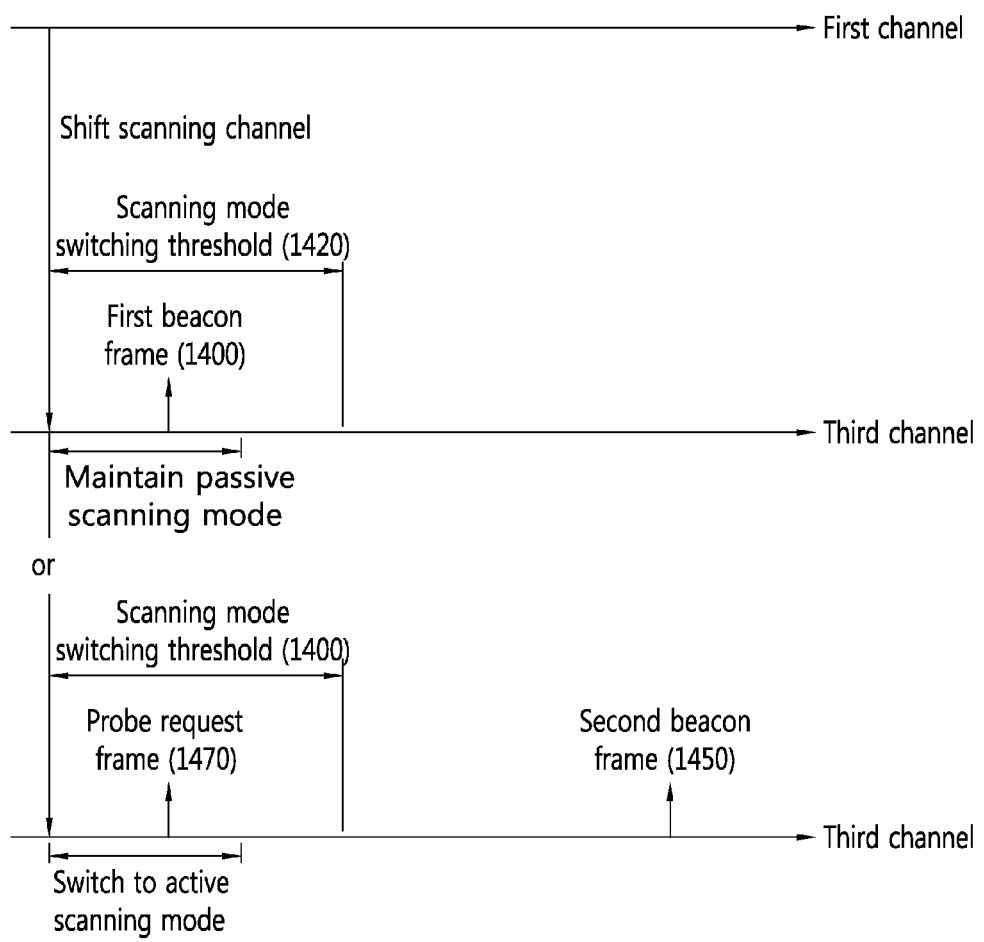
FIG. 14 is a concept view illustrating an operation mode switching method by an STA according to an embodiment of the present invention.

FIG. 14 is a concept view illustrating an operation mode switching method by an STA according to an embodiment of the present invention.

Referring to FIG. 14, the STA may set a predetermined threshold and switch from passive mode to active mode to determine whether to perform scanning.

In case the time taken until the target AP transmits a beacon frame is smaller than or equal to the scanning mode switching threshold 1420, the STA may maintain the scanning mode at passive mode. In contrast, in case the time taken until the target AP transmits a beacon frame is currently larger than the scanning mode switching threshold, the STA may switch the scanning mode from passive mode to active mode.

The beacon frame transmitted from the target AP may be assumed to be a first beacon frame 1400. The STA may calculate the time until the first beacon frame 1400 is transmitted through the beacon transmission time information of the first beacon frame 1400 included in the received discovery frame. Since the first beacon frame transmission time calculated by the STA is smaller than the scanning mode switching threshold 1420, the STA may remain in passive mode to monitor the beacon frame.

In contrast, the beacon frame transmitted from the target AP may be assumed to be a second beacon frame 1450. The STA may calculate the time until the second beacon frame 1450 is transmitted through the beacon transmission time information of the second beacon frame 1450 included in the received discovery frame. Since the second beacon frame transmission time calculated by the STA is larger than the scanning mode switching threshold 1420, the STA may switch the scanning mode from passive mode to active mode. The STA may transmit a probe request frame 1470 including the identifier information of the target AP to the AP.

Figure 15:
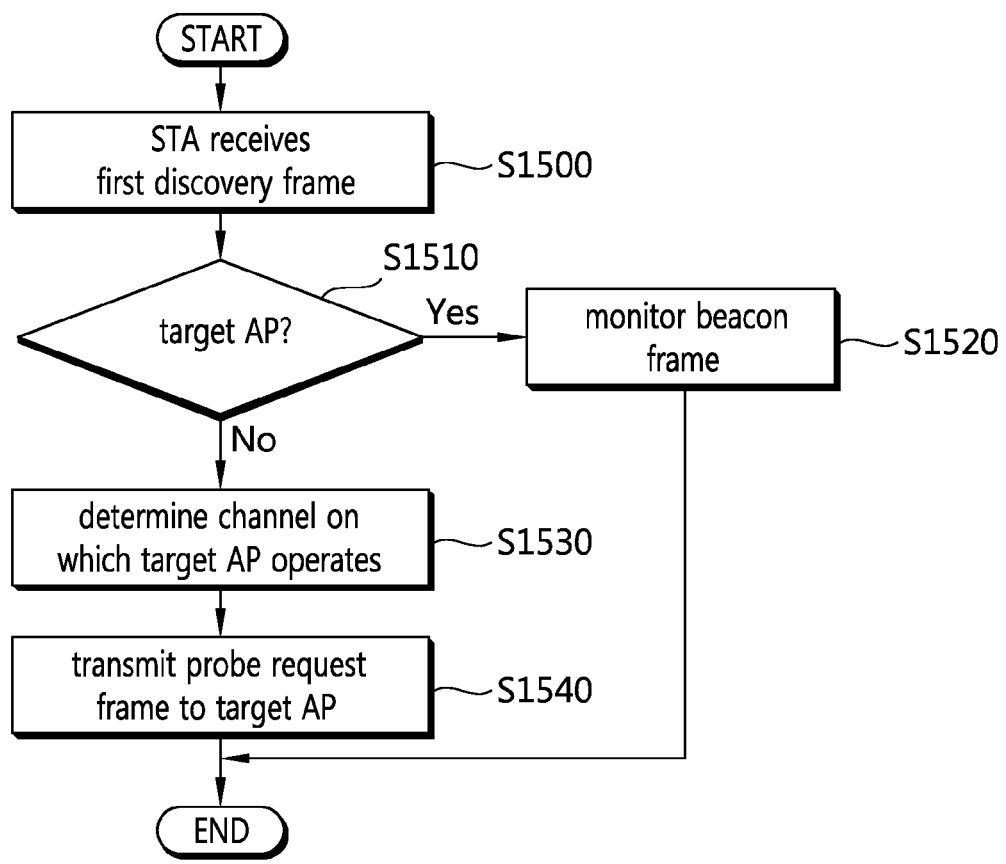
FIG. 15 is a flowchart illustrating an operation of an STA according to an embodiment of the present invention.

FIG. 15 is a flowchart illustrating an operation of an STA according to an embodiment of the present invention.

Referring to FIG. 15, the STA receives a first discovery frame (step S1500).

When receiving the first discovery frame, the STA determines whether the AP having transmitted the first discovery frame is a target AP (step S1510).

In case the STA determines that the AP that has transmitted the first discovery frame is the target AP, the STA may obtain information on the time during which the target AP transmits the beacon frame based on the beacon transmission time information included in the received first discovery frame. The STA monitors a beacon frame transmitted from the target AP (step S1520).

In case the STA determines that the AP that has transmitted the first discovery frame is the target AP, the STA may obtain information on the time during which the target AP transmits the beacon frame through the first discovery frame. The STA may receive the beacon frame transmitted from the target AP to perform a scanning procedure.

In an additional embodiment, the STA may determine whether to switch to sleep mode based on the beacon frame transmission time information as described above. In other words, in case it is determined there is a plenty of time remaining until the target AP transmits a beacon frame based on the beacon frame transmit information, the STA may switch to sleep mode to reduce power consumption of the STA.

In case the STA determines that the AP that has transmitted the first discovery frame is not the target AP, the STA determines a channel on which the target AP operates (step S1530).

In case the STA determines that the AP having transmitted the first discovery frame is not the target AP, the STA may obtain the information regarding the channel on which the target AP operates based on the neighbor AP information and information on the neighbor AP on other channel, which are included in the first discovery frame.

The STA transmits a probe request frame to the target AP (step S1540).

In case the target AP information is included in the neighbor AP information, this indicates that the target AP is present on the current channel, and the STA thus transmits a probe request frame including an identifier of the target AP on the current channel without the need of shifting the scanning channel.

In case the information on the neighbor AP on other channel contains the target AP information, this indicates that the target AP is not present on the current channel, and thus, the STA shifts the scanning channel to other channel on which the target AP is present. The STA that has shifted the scanning channel to other channel transmits a probe request frame including the identifier information of the target AP.

That is, unlike FIG. 11, the STA may switch the scanning mode from passive mode to active mode at step S1540 and transmits a probe request frame, thereby terminating the scanning procedure more quickly.

In an additional embodiment, as described above, the BSS load information of a discovery frame may be further considered in order to determine whether to switch the scanning mode from passive mode to active mode as in step S1540. For example, in case the BSS load is high, the STA may perform operation in passive mode without switching to active mode, and in case the BSS load is low, the STA may switch to active mode to perform operation.

Further, in a further additional embodiment, the STA may determine the target AP based on the BSS load information included in the discovery frame. For example, the STA may obtain the BSS load information of an AP present on each channel from the received discovery frame. The STA may obtain, through the received discovery frame, not only the BSS load information of the AP operating on the channel on which the STA is currently in operation but also the BSS load information of the AP operating on a channel other than the channel on which the STA currently operates.

The STA may determine the target AP based on the received discovery frame or may re-determine the determined target AP. For example, in case there are a plurality of APs to which the STA may be associated with, the STA may determine an AP to which the STA is to be associated with, based on the BSS load information. In another embodiment, in case the STA determines that the BSS load information of the target AP to which the STA attempted to be associated is high, the STA may change the target AP to other AP and may perform association with the changed AP.

Figure 16:
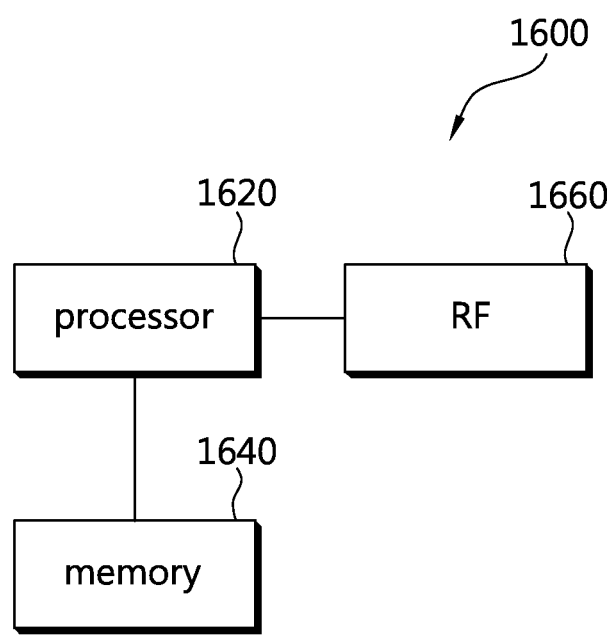
FIG. 16 is a block diagram illustrating a wireless device to which an embodiment of the present invention may apply.

FIG. 16 is a block diagram illustrating a wireless device to which an embodiment of the present invention may apply.

Referring to FIG. 16, the wireless device 1600 may be an STA that may implement the above-described embodiments, and the wireless device 1600 may be an AP or a non-AP STA (station).

The wireless device 1600 includes a processor 1620, a memory 1640, and an RF (Radio Frequency) unit 1660.

The RF unit 1660 may be connected with the processor 1620 to transmit/receive radio signals.

The processor 1620 implements functions, processes, and/or methods as proposed herein. For example, the processor 1620 may be implemented to perform the operation of the above-described wireless device according to an embodiment of the present invention.

For example, the processor 1620, in case the wireless device is an AP, may transmit a discovery frame including information on other AP operating on the channel on which the AP operates and information on an AP operating on other channel. The transmission period of the discovery frame may be shorter than the transmission period of a beacon frame of the AP. The information on the other AP on the current channel and other AP on the other channel may be BSS load information and identifier information of the AP and beacon frame transmission time information calculated with respect to the currently transmitted discovery frame.

Further, the processor 1620, in case the wireless device is an STA, may be implemented to receive, from a first AP operating on a first channel, identifier information and beacon frame transmission time information of a second AP operating on a second channel and to scan a beacon frame of the second AP based on the beacon frame transmission time information of the second AP.

The processor 1620 may include an ASIC (Application-Specific Integrated Circuit), other chipset, a logic circuit, a data processing device, and/or a converter that performs conversion between a baseband signal and a radio signal. The memory 1640 may include a ROM (Read-Only Memory), a RAM (Random Access Memory), a flash memory, a memory card, a storage medium, and/or other storage device. The RF unit 1660 may include one or more antennas that transmit and/or receive radio signals.

When an embodiment is implemented in software, the above-described schemes may be embodied in modules (processes, or functions, etc.) performing the above-described functions. The modules may be stored in the memory 1540 and may be executed by the processor 1520. The memory 1540 may be positioned in or outside the processor 1520 and may be connected with the processor 1520 via various well-known means.

What is claimed is:

1. A method for scanning in a wireless local area network (LAN), the method comprising:
    receiving, by a station(STA), a discovery frame from a first access point(AP) operating on a first channel, the discovery frame including identifier information of a second AP operating on a second channel and beacon frame transmission time information of the second AP; and
    scanning, by the STA, a beacon frame of the second AP based on the beacon frame transmission time information of the second AP,
    wherein the beacon frame transmission time information of the second AP includes information on a difference between a transmission time of the discovery frame and a transmission time of a beacon frame of the second AP transmitted after the discovery frame is transmitted, and
    wherein a transmission period of the discovery frame is shorter than a transmission period of a beacon frame of the first AP.

2. The method of claim 1,
    wherein the discovery frame further includes information on a number of all of the STAs included in a basic service set (BSS) of the second AP.

3. The method of claim 1,
    wherein the first channel and the second channel do not overlap each other, and
    wherein the STA is included in a basic service set (BSS) of the first AP before the discovery frame is transmitted.

4. The method of claim 1,
    wherein the scanning, by the STA, the beacon frame of the second AP based on the beacon frame transmission time information of the second AP includes:
    when a remaining time of a transmission of the beacon frame from the second AP is larger than an operation mode switching threshold, switching, by the STA, an operation mode from an active mode to a sleep mode; and
    switching, by the STA, the operation mode from the sleep mode back to the active mode based on the beacon frame transmission time information of the second AP to monitor the beacon frame.

5. The method of claim 1,
    wherein the first AP transmits beacon frame transmission time information of the first AP, identifier information of the first AP, and load information of the first AP through a distribution system to the second AP,
    wherein the second AP transmits the beacon frame transmission time information of the second AP, identifier information of the second AP, and load information of the second AP through the distribution system to the first AP,
    wherein the load information of the first AP includes information on a number of all of the STAs included in a basic service set (BSS) of the first AP, and
    wherein the load information of the second AP includes information on a number of all of the STAs included in a BSS of the second AP.

6. The method of claim 1,
    wherein the scanning, by the STA, the beacon frame of the second AP based on the beacon frame transmission time information of the second AP includes:
    when a remaining time of a transmission of the beacon frame from the second AP is larger than a scanning mode switching threshold, switching, by the STA, a scanning mode from a passive mode to an active mode;
    transmitting, by the STA, a probe request frame including an identifier of the second AP; and
    receiving, by the STA, a probe response frame from the second AP in response to the probe request frame.

7. The scanning method of claim 1,
    wherein the second AP is an AP determined as a target to be scanned by the STA before the STA receives the discovery frame.

8. An STA (station) of a wireless local area network (LAN) system, the STA comprising:
    a processor configured to:
    receive a discovery frame from a first access point(AP) operating on a first channel, the discovery frame including identifier information of a second AP operating on a second channel and beacon frame transmission time information of the second AP, and
    scan a beacon frame of the second AP based on the beacon frame transmission time information of the second AP,
    wherein the beacon frame transmission time information of the second AP includes information on a difference between a transmission time of the discovery frame and a transmission time of a beacon frame of the second AP transmitted after the discovery frame is transmitted, and
    wherein a transmission period of the discovery frame is shorter than a transmission period of a beacon frame of the first AP.

9. The STA of claim 8,
    wherein the discovery frame further includes information on a number of all of the STAs included in a basic service set (BSS) of the second AP.

10. The STA of claim 8,
    wherein the first channel and the second channel do not overlap each other, and wherein the STA is included in a basic service set (BSS) of the first AP before the discovery frame is transmitted.

11. The STA of claim 8,
    wherein the processor is configured to:
    when a remaining time of a transmission of the beacon frame from the second AP is larger than an operation mode switching threshold, switch an operation mode from active mode to sleep mode; and
    switch the operation mode from the sleep mode back to the active mode based on the beacon frame transmission time information of the second AP to monitor the beacon frame.

12. The STA of claim 8,
    wherein the first AP transmits beacon frame transmission time information of the first AP, identifier information of the first AP, and load information of the first AP through a distribution system to the second AP, wherein the second AP transmits the beacon frame transmission time information of the second AP, identifier information of the second AP, and load information of the second AP through the distribution system to the first AP, wherein the load information of the first AP includes information on a number of all of the STAs included in a basic service set (BSS) of the first AP, and wherein the load information of the second AP includes information on a number of all of the STAs included in a BSS of the second AP.

13. The STA of claim 8, wherein the processor is configured to:

when a remaining time when the beacon frame is transmitted from the second AP is larger than a scanning mode switching threshold, switch a scanning mode from passive mode to active mode;

transmit a probe request frame including an identifier of the second AP; and receive a probe response frame from the second AP in response to the probe request frame.

14. The STA of claim 8, wherein the second AP is an AP determined as a target to be scanned by the STA before the STA receives the discovery frame.

* * * * *